United States Patent [19]

Fujii et al.

[11] Patent Number: 4,520,370
[45] Date of Patent: May 28, 1985

[54] LASER THERMAL PRINTER

[75] Inventors: Yoshihiko Fujii; Osamu Tomita, both of Osaka; Itaru Taniguchi, Motomachi; Kazuhiko Saiwai, Osaka, all of Japan

[73] Assignee: Kanzaki Paper Manufacturing Co., Ltd., Tokyo, Japan

[21] Appl. No.: 468,905

[22] Filed: Feb. 23, 1983

[30] Foreign Application Priority Data

Feb. 27, 1982 [JP] Japan ................................. 57-30988

[51] Int. Cl.$^3$ ...................... G01G 13/02; G01G 13/16
[52] U.S. Cl. ..................................... 346/76 L; 346/108
[58] Field of Search ............... 346/76 L, 108; 250/227

[56] References Cited

U.S. PATENT DOCUMENTS

| | | | |
|---|---|---|---|
| 3,874,621 | 4/1975 | Blair et al. | 346/108 |
| 4,307,409 | 12/1981 | Greenig et al. | 346/108 |
| 4,401,992 | 8/1983 | Vorst et al. | 346/76 L |

*Primary Examiner*—George H. Miller, Jr.
*Attorney, Agent, or Firm*—Morgan, Finnegan, Pine, Foley & Lee

[57] ABSTRACT

A laser thermal printer is disclosed. The printer comprises a $CO_2$ gas laser light source, a modulator for the laser beam from said laser source, an optical scanning system for scanning the laser beam, which is passed through said modulator, transversely of a predetermined recording surface while focusing it on said surface, and a web feed mechanism for feeding a heat-sensitive recording web, which presents said recording surface, in a direction at right angles with the direction of said beam scanning.

10 Claims, 8 Drawing Figures

LASER THERMAL PRINTER

BACKGROUND OF THE INVENTION

The present invention relates to a laser beam type high speed thermal printer (hereinafter referred to as "laser thermal printer") wherein laser beams are radiated to a heat-sensitive recording web, such as heat-sensitive recording paper, to cause thermal development of color.

In the thermal printer designed to cause development of color by microspot-heating heat-sensitive recording paper according to a print pattern, the common heating system is, at present, of the so-called contact type. In this type, very fine heating bodies are arranged along the width of the heat-sensitive recording paper and selectively turned on and off to develop desired letters or figures on the paper being fed. Therefore, this type is liable to malfunction or deteriorate owing to the heat-sensitive recording layer of the heat-sensitive recording paper adhering to or accumulating on the heating bodies (printed head) which contact the heat-sensitive recording layer.

The laser thermal printer of the present invention is intended to solve such problems about the contact type thermal printer. More particularly, according to the laser system, without the use of a printing head or the like physically contacting the heat-sensitive recording layer, laser beams are radiated as micro-spots or dots according to a desired print pattern, their thermal energy being used to print letters (or figures), so that there is no problem of adhesion or accumulation described above.

However, in order to construct a practical laser thermal printer using heat-sensitive recording paper, it is necessary to meet the requirements including satisfactory correspondence between the laser wavelength and the absorption wavelength of the paper, and less decrease in the width of the peak wavelength or less attenuation of the beam caused by the so-called modulation mechanism for turning on and off the beam radiation according to a print pattern. At present, there is no laser thermal printer that satisfies these requirements; only methods proposed as possibilities include one for incorporating a special material in heat-sensitive recording paper which absorbs laser beam so as to make up for the deviation between the laser wavelength and the absorption wavelength of the heat-sensitive recording paper.

In addition, of the presently commercially available printers, those called the laser type are of the electrostatic print type using wood free paper and designed to modulate the output of the He-Ne laser to form an electrostatic latent image on a photo-sensitive drum and to thereby transfer the toner; thus, they have nothing to do with the laser thermal print type of the present invention.

The inventors have made various experiments and studies with attempts to solve the problems encountered in constructing the laser thermal printer described above and have found that if a $CO_2$ gas laser in which the beam wavelength is within the range of 9.2 to 10.6 $\mu$m is used as the laser source, a heat-sensitive color developing layer having a high absorption power can be formed on the heat-sensitive recording paper, making it possible to print letters through direct laser radiation, and sufficiently high speed printing is possible when the laser output power is 10 W or more. On the other hand, it has been found that the He-Ne laser and YAG laser are not for practical use from the standpoint of their wavelength and the output powers obtained.

SUMMARY OF THE INVENTION

Accordingly, it is the principal object of the invention to provide a $CO_2$ gas laser thermal printer constituting a novel non-contact printer to solve the aforementioned problems.

It is another object of the invention to provide a novel non-contact $CO_2$ gas laser printer including an effectively operative laser scanning system which is simple in construction, said system employing a galvanomirror.

It is a further object of the invention to provide a novel non-contact $CO_2$ gas laser printer including a rotary laser scanning capable of high speed scanning employing a polygon mirror.

In order to achieve the above objects, it should be considered what kind of optical modulators are suitable for turning on and off the scanning beams according to a pattern to be printed. For the modulation of laser beams, it is known to use such an internal modulation system that manipulates the laser oscillator itself, and an external modulation system consisting of an external element such as electro-optic modulator, accousto-optic modulator, or magneto-optic modulator. However, one of the problems encountered in using the internal modulation system is a decrease in the "Q" value of the resonator in the laser oscillator, and another problem therein is an increase in the output power loss of the oscillator due to inserting the modulator element thereto. On the other hand, the external modulation system is also liable to increase the output power loss because of an infrared absorption according to a kind of the modulator elements.

For the modulation system of the invention, it is therefore intended to use an external modulation system, preferably an electro-optic modulator or an acousto-optic modulator as hereinafter described.

An electro-optic modulator generally utilizes a so-called primary electro-optic effect (or Pockels effect) of varying in the refractive index of crystal in response to the varying electric field established therein. Basically, the modulator may comprise a modulator head including some kind of single crystal, a polarizer, and a driver circuit for establishing an electric field to the head. In embodying the invention, as the above single crystal for modulating the infrared beams of wavelength from 9.2 to 10.6 $\mu$m out of the $CO_2$ gas laser oscillator, it is desirable to select one of a material having a considerably high transmittance for such wavelength of laser beams. For example, CdTe, GaAs, ZnSe or the like single crystal material may be used. Among them, CdTe single crystal is most preferred. For instance, the comparison between CdTe crystal and GaAs crystal is as follows:

(1) The absorption loss of laser beams at the wavelength of 10.6 $\mu$m is 0.2 percent/cm in CdTe while 2.0 percent/cm in GaAs.

(2) The half-wavelength voltage required to drive the modulator of CdTe is about one half of that voltage of GaAs.

(3) CdTe crystal has a moisture resistance higher than that of GaAs.

Therefore, the electro-optic modulator of the invention preferably includes a modulator head consisting of CdTe single crystal. A driver for this modulator preferably consists of a square wave oscillator having a modulation frequency within the range from 30 KHz to 1 GHz, preferably from 100 KHz to 3 MHz at a half wavelength voltage (peak value) of ±2.5 KV. In the above constitution, a polarizer element is preferably of an element made of Ge or ZnSe material.

On the other hand, acousto-optic modulator utilizes an effect of varying in the refractive index of crystal in response to an external pressure, such as one by ultrasonic wave applied thereto. Basically, the modulator may comprise a modulator head including some kind of single crystal with a piezoelectric transducer element adhered thereto, and a driver circuit for driving the modulator head. In case of optionally employing such an acousto-optic modulator in the invention, for a good transmittance for infrared beams, the modulator head is preferably made up from Ge single crystal material. Comparing such an acousto-optic modulator like that with the aforementioned electro-optic modulators, particularly with those consisting of CdTe single crystal material, the former requires a beam condenser to free the modulator from the shortcoming of confined diameter of laser beams incident upon the modulator head.

The acousto-optic modulator has further problems that the power output loss is larger than that of the electro-optic modulator, and that the beam-extinction ratio is smaller than that of the electro-optic modulator. However, the acousto-optic modulator is comparatively inexpensive, and if the modulation frequency is set at the frequency of a few or more mega-herz, then the modulator can be driven at a relatively low energy.

Accordingly, the modulator of the invention employs an electro-optic head preferably made of CdTe single crystal, and optionally employs an acousto-optic head preferably made of Ge single crystal.

In the $CO_2$ gas laser thermal printer of the invention having the above external modulation system, to scan the laser beam in the traverse direction of recording paper, either a galvanomirror or a polygon mirror is generally used. It may be considered to use optical fibers which are mechanically driven for the beam scanning, but such mechanical scanning is inferior to the above two mirror systems in the reliability and stability of scanning.

As is well known, the galvanomirror is an vibration mirror adapted to change its angular position according to the current flowing through the solenoid thereof, which has a relatively small size, and a good linearity irrespective of its easily mountable constitution. However, the galvanomirror has a problem of relatively low speed scanning because the moving speed of mirror at each end portion of vibration stroke is of zero and thereabout.

The polygon mirror is continuously rotated in one direction with its sides successively appearing at the position of incidence of beam, so that laser beam scanning across the heat-sensitive recording paper in either the rightward or leftward direction can be effected substantially without interruption to provide a relatively high speed scanning. However, the polygon mirror scanner is relatively large in volume so that the configuration of the mirror system must be sufficiently devised for the volume.

The scanning beam formed by either of the above two scanning systems is projected on a $F\theta$ mirror from which the reflected beam is focused directly to the surface of the recording paper. The $F\theta$ mirror should have an aluminum or gold-plating film on the surface thereof, which has a relatively small infrared absorptivity. Besides, even if the substitution of an $F\theta$ lens for the $F\theta$ mirror is intended, a relatively large infrared absorptivity of the lens will become an obstacle thereto.

The above and other objects and advantages of the invention will become apparent from the following description of preferred embodiments to be given with reference to the drawings.

DETAILED DESCRIPTION OF THE INVENTION

In embodying the invention, the following optical theory should be taken into consideration.

The functions of the $CO_2$ gas laser thermal printer of the invention comprises illuminating the laser beams as microspots to the surface of heat-sensitive recording paper in accordance with a pattern to be printed, and developing the pattern representing any letters, figures or the like by heat energy directly applied in the form of laser beams on the surface. It is desirable to provide a resolving power (the number of dots/unit distance of scanning) of the developing images as high as possible. For this purpose, the laser beams emanating from the laser oscillator and passing through the optical modulator should be adjusted for the most suitable diameter at the mirror surface of a scanning system.

Now, the optical diffraction theory gives the relation between the beam divergence angle $\Delta\theta$ (m rad) and beam emanation diameter D (mm) at a diffraction surface in wavelength $\lambda$ ($\mu$m) as the equation:

$$(4/\pi)\lambda = \Delta\theta \times D \quad (1)$$

That is, the beam diameter at the diffraction surface is inversely proportional to the divergence angle. On the other hand, the laser beam reflected from the scanning mirror is then projected on the surface of an $F\theta$ mirror. In this manner, the dot diameter R ($\mu$m) at the surface of recording paper is established as the equation:

$$R = F \times \Delta\theta \quad (2)$$

where, the symbol F represents the focal length of the Fθ mirror. The equation (1) is substituted for the term in equation (2).

$$R = F \times 4\lambda/(\pi \cdot D) \qquad (3)$$

From the above equation (3), it is understood that the diameter of the incident beam dot on the recording paper is reduced in response to the rate of expansion of beam diameter at the mirror surface of the scanning system before the Fθ mirror. The expansion of the laser beam can be achieved by an additional beam expander mirror. Thus, the increasing of resolution is possible. For example, where a $CO_2$ gas laser oscillator with a wavelength of 10.6 μm, a beam emission diameter of 3.7 mm and a beam divergence angle of 3.7 m rad., and an Fθ mirror whose focal length is 300 mm are used, if the diameter of the incident beam upon the scanning mirror is expanded to 10 mm by the expander mirror, the diameter of the dot on the recording paper becomes about 400 μm (resolving power, 2.5 dots/mm), but if said mirror incident beam diameter is expanded to 20 mm, said dot diameter can be decreased to about 200 μm (resolving power, 5 dots/mm). As a result, the resolving power becomes two times the original resolving power.

Figure 1:
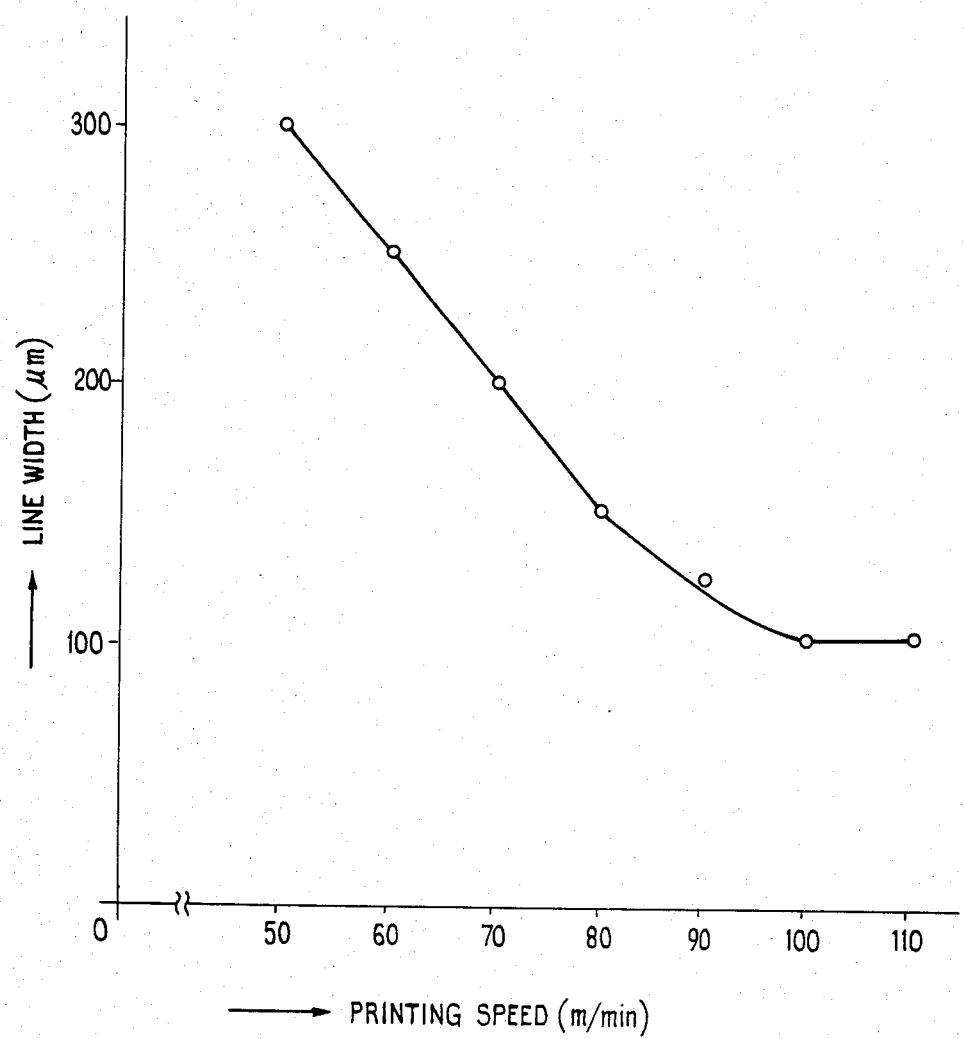
FIG. 1 is a graph showing the relation between the print line width and the print recording speed in a $CO_2$ gas laser printer.

Besides, this result is given from calculation by the equation (3), but the practical dot diameter of incident beam on the surface of recording paper is also dependent upon the other various factors, such as the scanning speed of laser beams and the output power of the $CO_2$ gas laser oscillator. For example, FIG. 1 is a graph of the relation between the scanning speed (or the recording in this instance) and the printed line width (or the dot diameter) on the surface of recording paper projected with a $CO_2$ gas laser beam of 4.5 W through a condensing lens having a focal length of 50 mm. As shown in the graph of FIG. 1, it is understood that the line width becomes slender in response to the increasing of the recording speed, and that the line width of the order of 100 mm is obtained at the recording speed of the order of 100 m/min.

Preferred embodiments of the present invention will now be described with reference to the drawings.

Figure 2:
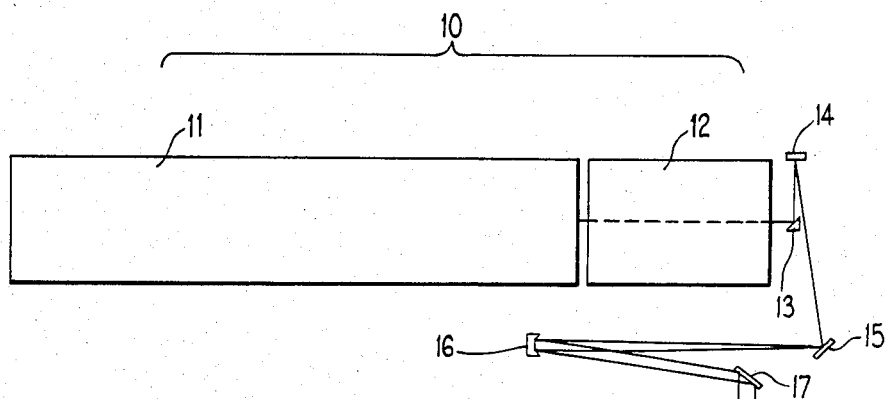
FIG. 2 is a schematic front view of a preferred embodiment of a thermal printer using a $CO_2$ gas laser with a galvanomirror scanner according to the present invention.

Referring to FIG. 2, there is shown a laser light emission and modulation system 10 including a $CO_2$ gas laser oscillator generally indicated by 11 and an electro-optic modulator generally indicated by 12 for on-off modulating the laser beam omitted from said oscillator 11. This modulator is composed of a CdTe single crystal element and a Ge polarizer plate as described hereinbefore.

The laser beam from this modulator falls on a scanner 18 via a reflecting mirror 13, a beam expander mirror 14, a reflecting mirror 15, a beam expander mirror 16, and a bending mirror 17. The scanner 18 comprising the galvanomirror is opposed to an Fθ mirror 19 so that the latter reflects the beam which falls within the range corresponding to the scanning angle of the scanner 18, causing the beam to fall on the corresponding spot position on heat-sensitive recording paper 20. The Fθ mirror, unlike the Fθ lens for which absorption in the infrared region becomes a problem, will reflect laser beams highly efficiently.

Figure 3:
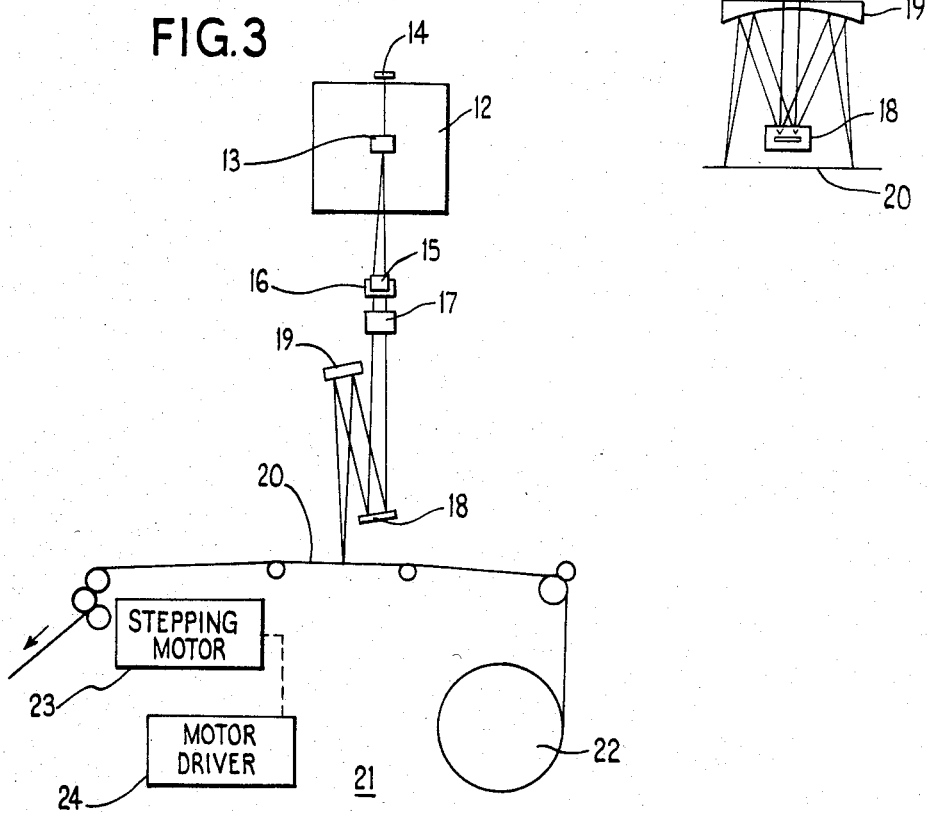
FIG. 3 is a schematic side view of the printer of FIG. 2.

FIG. 3 is a side view showing the scanning optical system comprising the mirrors 13, 14, 15, 16, 17, the galvanomirror 18 and the Fθ mirror 19, with a recording paper feed mechanism being shown in detail. In the recording paper feed mechanism 21, the numeral 22 denotes a recording paper roll; 23 denotes a stepping motor; and 24 denotes a motor driver.

In the embodiment described above, the $CO_2$ gas laser oscillator is of the seal-off type, with an wavelength of 10.6 μm, an output power of 16 W, a beam divergence angle of 3.7 m rad. and an emanating beam diameter of 3.7 mmφ. The CdTe electro-optic modulator 12 controls the electric field to be established to the crystal body in a predetermined direction and modulates light. In this case, it was possible to turn on and off the laser beam at a beam extinction ratio of 50:1. As the driver for this modulator, use was made of a rectangular wave oscillator with a peak value of ±2.5 KV and a modulation frequency of 100 KHz. The incident laser beam upon the galvanomirror 18 has a diameter of 20 mmφ expanded by the beam expander mirrors 14 and 16. The focal length of Fθ mirror 19 is of 300 mm. Aluminum or gold was effectively employed as reflection coating agents for the mirror in the reflection optical system 13, 14 ... 19 including the galvanomirror 18.

In such an arrangement, the 16 W laser beam was radiated, with an attenuation of about 20% as a whole, to the commercially available heat-sensitive recording paper, whereby a resolving power of 10 dot/mm and a Macbeth densito-meter color density of more than 1.0 were obtained. The recording speed was about 60 seconds for Size A-4 (210×297 mm) paper.

By way of comparison, an A/O acousto-optic modulator was used in place of the CdTe electro-optic modulator, but because of the relatively large output loss of the modulator, it took about 75 seconds to make a record on the same Size A-4 paper.

Figure 4:
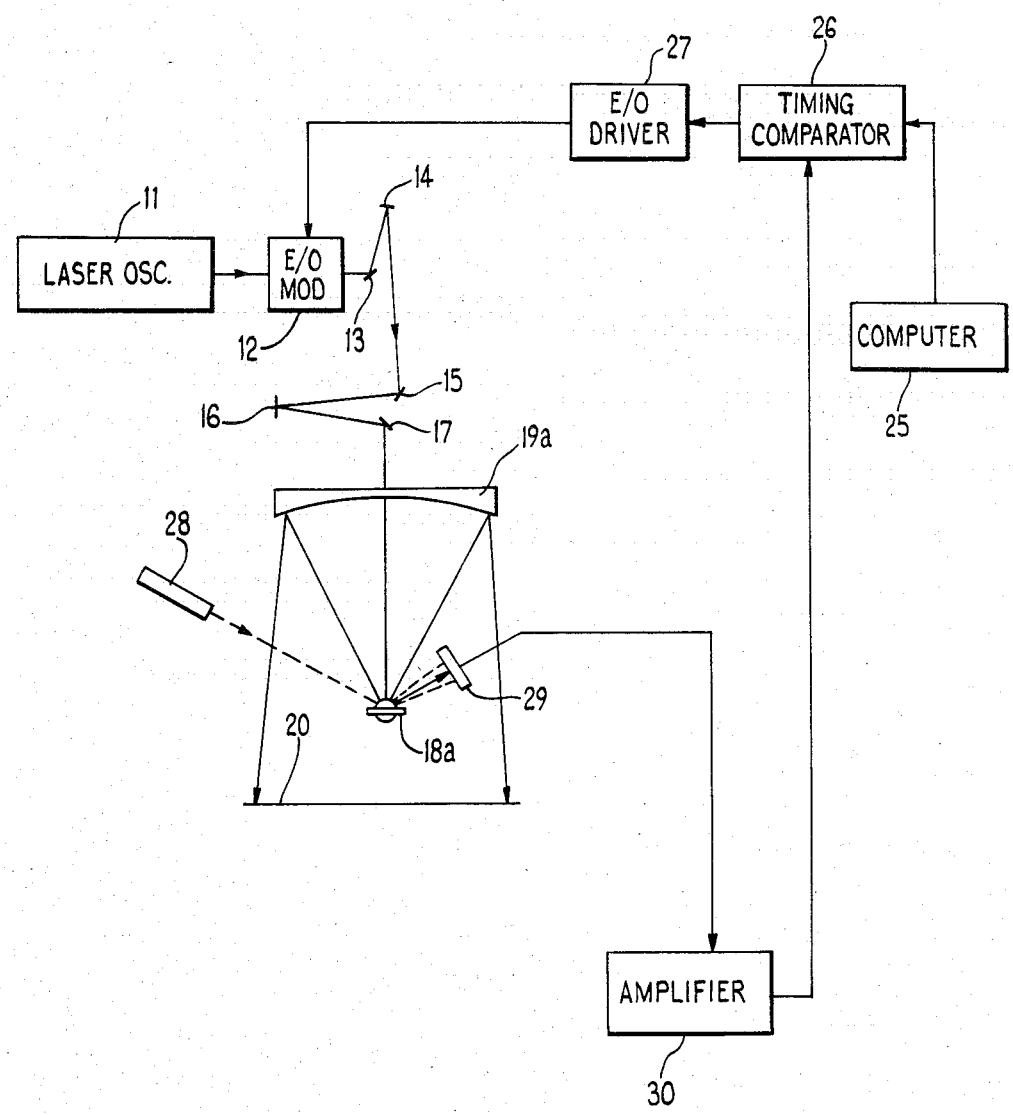
FIG. 4 is a schematic front view of a block arrangement and apparatus, showing an embodiment of a $CO_2$ gas laser thermal printer equipped with an angular position detecting mechanism for a galvanomirror type scanner.
Figure 5:
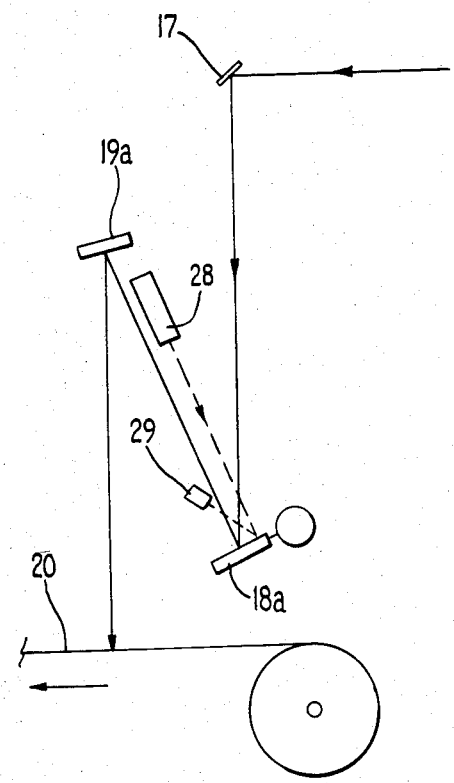
FIG. 5 is a schematic side view of the apparatus of FIG. 4.

FIGS. 4 and 5 show a $CO_2$ gas laser thermal printer using a galvanomirror scanning system, which is equipped with a mirror angular position detecting mechanism.

In a preferred embodiment of said mirror angular position detecting mechanism, a one-dimensional image sensor is used to detect the mirror angle from a referencing reflected light from a scanning mirror. For the one-dimensional image sensor, use is made of a one-dimensional light receiving diode array comprising light receiving diodes set in array, and charge coupled device (CCD) integrally connected thereto. In recent years, this kind of image sensors have been greatly decreased in size and increased in precision, one such image sensor available having about 1,700 diodes integrated in a total length of about 50 mm. With this number of diodes, when it is assigned for one swing of the galvanomirror (one scanning line on the recording surface), each diode in the array can be made to correspond to the picture element for a resolving power of as high as about 8 dots/mm in the case of Size A-4, which is a short size. This makes it possible not only to accurately detect the angular position of the mirror but also to synchronize the position detection signal in the form of a digital signal very easily with the modulation of the laser beam to be driven in timing. Thus, according to the present invention, in a scanning type laser thermal printer using a scanning mirror, particularly galvanomirror, desired printer patterns can be thermally recorded with good reproducibility.

In the printer apparatus of FIGS. 4 and 5, components identical or substantially identical to those in the basic embodiment shown in FIGS. 2 and 3 are indicated by the same or substantially same reference characters to simplify the description. In this printer apparatus equipped with a mirror angular position detecting mechanism, the laser beam scanning path on the heat-sensitive recording paper described by the galvanomirror 18a is set as a row of picture elements with a disposition density of several or more dots/mm if possible. The electro-optic modulator 12 serves to turn on and off the laser beam which provides each element according to a desired print pattern. Thus, a computer 25 transfers such a digital modulation signal to the electro-optic modulator 12 through a timing comparator circuit 26 and an electro-optic driver 27.

In this embodiment, the laser beam modulation by the electro-optic modulator is synchronized accurately with the angular position detecting signal associated with the galvanomirror 18a. Thus, the galvanomirror 18a is opposed to an auxiliary light source 28 and a one-dimensional image sensor 29 in such a manner as not to cross the path of incident light from the mirror 17 and the path of reflected light to the F$\theta$ mirror 19a. In the embodiment, the image sensor 29 is in the form of a one-dimensional light receiving diode array comprising 1,728 light receiving PN-junction diodes arranged one-dimensionally and CCD (charged coupled device) connected thereto, and the light from the auxiliary light source 28 deflected from the galvanomirror which swings clockwise and counterclockwise in FIG. 4 is received by said image sensor at a position (diode element) corresponding to the swing angle thereof. The signal output of the image sensor 29 is connected to the timing comparator circuit 26 through an amplifier circuit 30.

As shown in FIG. 4, the purpose of positioning the image sensor 29 in close vicinity to the galvanomirror 18a is to associate the angle of deflection of the axis of the reflected light from the galvanomirror with the light receiving diode array which is relatively short (tens of millimeters). Thus, in order that such close positioning may not obstruct the path of the laser beam falling on and reflected from the galvanomirror 18a, the path of incident light from the auxiliary light source 28 and the path of reflected light to the image sensor 29 are deviated from the path of laser light, as shown in FIGS. 4 and 5. Further, it is necessary that the position of incidence of laser light on the galvanomirror 18a be deviated from the position of incidence of the auxiliary reference detection light.

In addition, there is no particular restriction on the kind of the auxiliary light source 28; for example, a laser light source such as helium-neon laser may be used. It may be white light, but in this case it is necessary to provide an optical system for focusing to a light receiving width for one diode element in the image sensor.

With the arrangement described above, the galvanomirror angular position detection signal from the image sensor 29 is fed to the timing comparator circuit 26 via the amplifier circuit 30. As a result, the picture element selection signal from the computer 25 is transferred to the electro-optic driver 27 in perfect synchronism with the detected picture element position, and electro-optic modulator 12 is capable of producing a modulation beam which accurately reproduces a desired pattern inputted in the computer 25.

Figure 7:
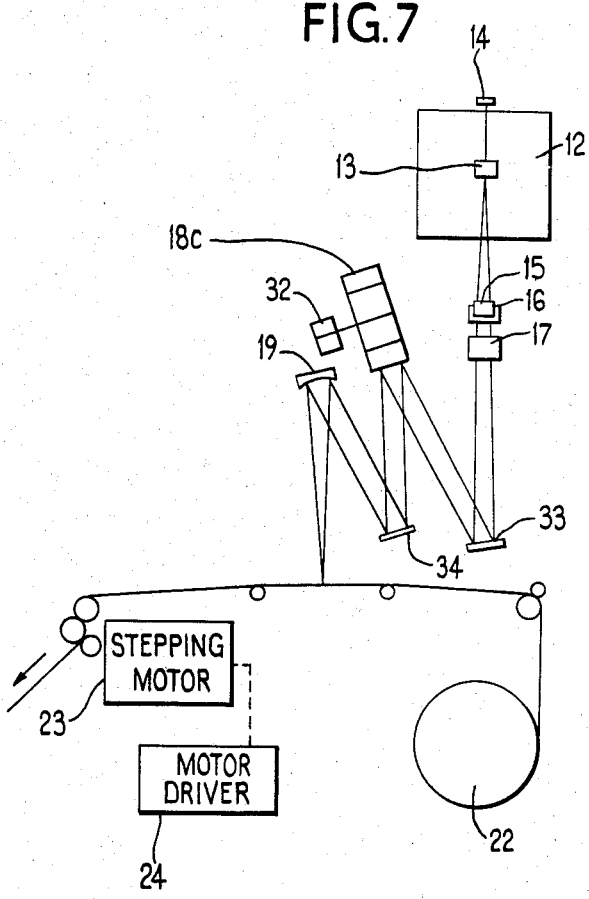
FIG. 7 is a schematic side view showing an embodiment of a laser thermal printer according to the invention with a polygon mirror scanning system applied thereto.
Figure 8:
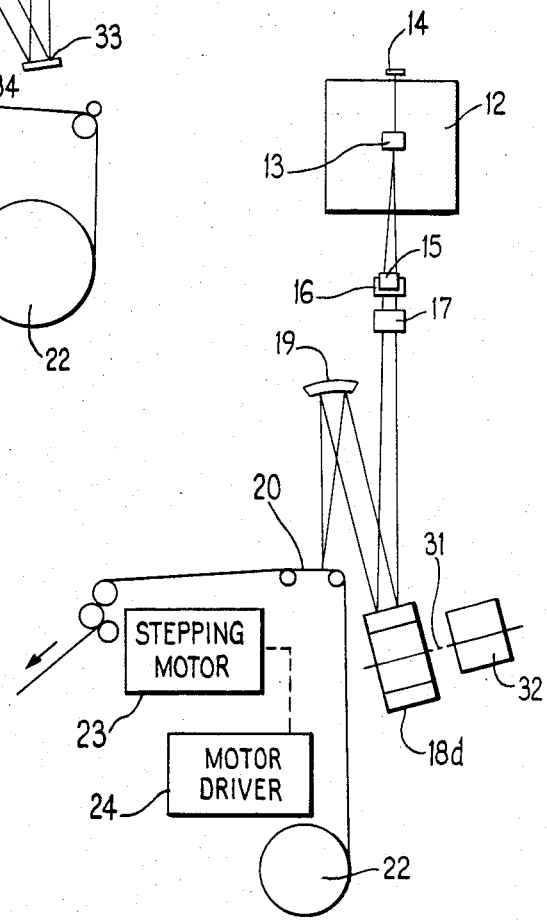
FIG. 8 is a schematic side view showing another embodiment of a laser thermal printer using a polygon mirror scanning system.

FIGS. 7 and 8 show an embodiment of a $CO_2$ gas laser thermal printer wherein the galvanomirror is replaced by a polygon mirror to effect beam scanning. To understand this embodiment, it is necessary to take into consideration the following point about the size of the polygon mirror and the related mechanism.

For example, in order to apply the laser beam having the incident beam diameter of 20 mm thus calculated to the polygon mirror serving as the scanning mirror, the length (axial dimension) and width of each lateral surface of the polygon mirror must be made greater than 20 mm. In this case, the radius r (the distance from the center axis to the side line parallel thereto) of an n-sided polygon mirror (a multi-mirror having an n-sided regular polygonal cross-section with each side of the polygon having a length (a) is given by $$r = a/2 \cdot \text{cosec } \pi/n \qquad (4)$$

For example, for an octagonal prism with a=25 mm, r=32.7 mm and for a dodecagonal prism, it is about 48.3 mm. With a polygon mirror having such a size, the scanning mirror and related mechanism arrangement in the galvanomirror system using the same light source and the same F$\theta$ mirror cannot be used as such. More particularly, in the case of the basic arrangement shown in FIGS. 2 and 3, with the assumption that a polygon mirror has a displacement angle range corresponding to the oscillation angle range of the galvanomirror, even if it is substituted, it cannot be arranged in position since it overlaps the plane of movement of the recording paper, as shown in phantom lines 18b in FIG. 6. In this case, it may be thought to increase the distance between it and the recording paper by means of an F$\theta$ mirror having a large focal length, but it would also be necessary to increase the degree of enlargement of the diameter of the beam radiated to the polygon mirror, thus resulting in a decrease in resolving power, which, in turn, would make it necessary to increase the size of the polygon mirror; this is undesirable.

Figure 6:
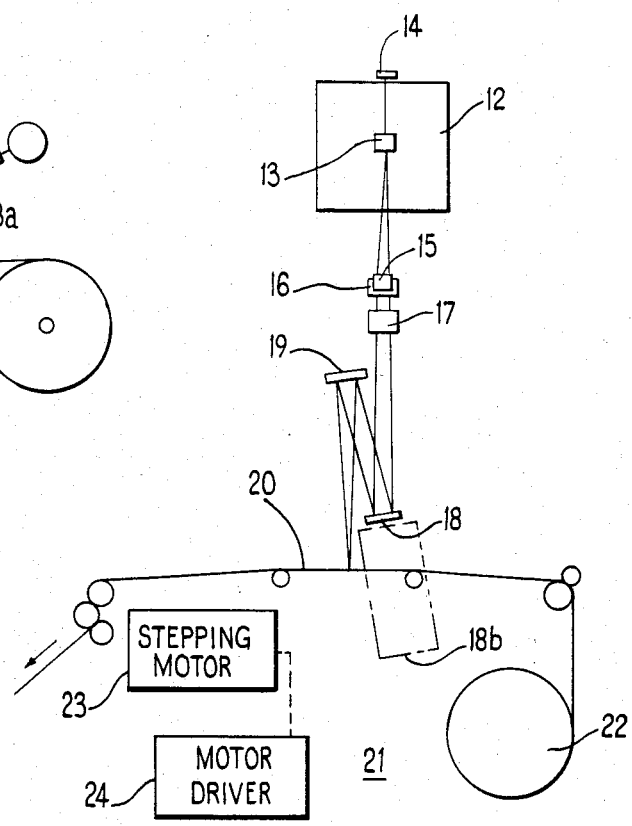
FIG. 6 is a similar schematic side view including an imaginal view where a polygon mirror is applied to the printer of FIG. 3.

According to the present invention in one manner as shown in FIG. 7, two additional reflecting mirrors 33 and 34 are placed in the face of the scanning mirror 18c slightly deviating from the normal of the mirror 18b in FIG. 6 oppositely to each other for establishing the substantial length of an optical path. The incident laser beam upon the polygon mirror 18c has been reflected from the reflecting mirror 33, and the scanning beam from the polygon mirror 18c is directed to the other reflecting mirror 34 from which the reflected beam is directed to the F$\theta$ mirror 19. In the embodiment of FIG. 7 the additional output loss caused from the two reflecting mirrors 33 and 34 is substantially negligible. This embodiment is substantially the same to the embodiment of FIGS. 2 and 3 except that the polygon mirror 18c in the form of an octagonal prism and a driver for the beam modulator comprising a rectangular wave oscillator with a crest value of ±2.5 KV and a modulation frequency of 150 KHz take the places of the galvanomirror 18 and the driver in the first embodiment, respectively. In this case, the recorded images at a resolving power of 10 dot/mm was obtained. The recording speed is about 40 seconds for the Size A-4 paper.

In the other manner according to the present invention, the polygon mirror is arranged in the manner shown in FIG. 8, the feed path of the recording paper 20 is downwardly bent in a region before it reaches the beam applying position (print position), so that the recording paper roll 22 is disposed immediately below the beam applying position; thus the recording paper vertically upwardly withdrawn from the roll 22 is bent to the horizontal at the beam applying position. The space along the vertical portion of the recording paper 20 serves as an installation space for the polygon mirror 18d, which is supported by a drive motor 32, with the mirror rotation axis 31 suitably inclined. Thus, the polygon mirror 18d reflects the laser beam to the Fθ mirror 19, by which it can be scanned and projected on the recording paper with a desired beam diameter. In addition, the polygon mirror illustrated in the embodiment is prismatic, but a polygon mirror in the form of a truncated piramid having a horizontal rotary axis may be used.

What is claimed is:

1. A laser thermal printer comprising a $CO_2$ gas laser source,
  a CdTe electro-optic modulator for the laser beam from said laser source,
  an optical scanning system for scanning the laser beam, which is passed through said modulator, transversely of a predetermined recording surface while focusing it on said surface, and
  a web feed mechanism for feeding a heat-sensitive recording web, which presents said recording surface, in a direction at right angles with the direction of said beam scanning.

2. A laser thermal printer as set forth in claim 1, wherein said optical scanning system includes a scanner in the form of a galvanomirror.

3. A laser thermal printer having an angular position detecting mechanism for a scanning mirror, comprising:
  a $CO_2$ gas laser source,
  a CdTe electro-optic modulator for the laser beam from said laser source,
  an optical scanning system composed of a galvanomirror for scanning the laser beam, which is passed through said modulator, traversely of a predetermined recording surface while focusing it on said surface,
  a web feeding mechanism for feeding a heat-sensitive recording web, which presents said recording surface, in a direction at right angles with the direction of said beam scanning,
  a light source for a reference light ray arranged to project the reference light ray on the surface of said galvanomirror and to oscillate the optical axis of the reflected light according to the scanning angle of said galvanomirror, and
  a one-dimensional image sensor for receiving said reflected light in the overall oscillation range of the optical axis thereof to generate a signal indicating the path of movement of the angular position thereof, thereby effecting modulation of said laser beam in synchronism with the output signal from said image sensor.

4. A laser thermal printer as set forth in claim 3, wherein the one-dimensional sensor comprises a one-dimensional light receiving diode array in which a charge coupled device is integrated.

5. A laser thermal printer as set forth in claim 4, wherein the number of arrayed diodes of the one-dimensional image sensor corresponds to the number of picture elements on the heat-sensitive recording web surface included in one scanning of the laser beam.

6. A laser thermal printer comprising:
  a $CO_2$ gas laser source,
  a CdTe electro-optic modulator for a beam from said laser source,
  an optical scanning system including a polygon mirror for scanning the laser beam, which is passed through said modulator, transversely of a predetermined heat-sensitive recording surface while focusing it on said surface, and
  a web feed mechanism for feeding a heat-sensitive recording web, which presents said heat-sensitive recording surface, in a direction at right angles with the direction of said beam scanning.

7. A laser thermal printer as set forth in claim 6, wherein two additional reflecting mirrors are placed in the face of said scanning polygon mirror slightly deviating from the normal of the mirror surface of said polygon mirror oppositely to each other for establishing the substantial length of an optical path.

8. A laser thermal printer as set forth in claim 6, wherein said optical scanning system is so arranged that the laser beam dynamically reflected by the rotation of the polygon mirror is reflected and focused by an Fθ mirror to scan said heat-sensitive recording surface, and said polygon mirror is positioned at least partially on the side of the laser incident surface for said heat-sensitive recording web opposite to said Fθ mirror.

9. A laser thermal printer as set forth in claim 8, wherein a region of the feed path of the heat-sensitive recording web located either before or after said laser incident position is vertically bent, and the space available laterally of the vertical feed plane is used as the installation space for said polygon mirror.

10. A laser thermal printer comprising:
  a $CO_2$ gas laser source,
  a Ge acoustic-optic modulator for the laser beam from said laser source,
  an optical scanning system for scanning the laser beam, which is passed through said modulator, transversely of a predetermined recording surface while focusing it on said surface, and
  a web feed mechanism for feeding a heat-sensitive recording web, which presents said recording surface, in a direction at right angles with the direction of said beam scanning.

* * * * *